United States Patent [19]

Denney

[11] 4,083,122
[45] Apr. 11, 1978

[54] WORLD GLOBE WHICH CAN BE ASSEMBLED OR DISASSEMBLED

[76] Inventor: Don W. Denney, 19215 Marine View Cir. SW., Seattle, Wash. 98166

[21] Appl. No.: 777,403

[22] Filed: Mar. 14, 1977

[51] Int. Cl.² .............................................. G09B 27/08
[52] U.S. Cl. .................................................. 35/46 A
[58] Field of Search ........................ 35/46 R, 46 A, 47

[56] References Cited

U.S. PATENT DOCUMENTS

| | | | |
|---|---|---|---|
| 895,263 | 8/1908 | Harger | 35/46 A |
| 1,375,853 | 4/1921 | Lyman | 35/46 A |
| 1,629,582 | 5/1927 | McClintock | 35/46 A |
| 2,083,988 | 6/1937 | Dupler | 35/46 R |
| 2,153,053 | 4/1939 | Smith | 35/46 A |
| 2,228,736 | 1/1941 | Starworth | 35/46 A |
| 2,368,347 | 1/1945 | Colberg | 35/46 R |
| 2,892,268 | 6/1959 | Hagner | 35/47 |
| 3,016,629 | 1/1962 | Case | 35/46 R |
| 3,037,300 | 6/1962 | Grosser | 35/46 A |
| 3,683,517 | 8/1972 | Starworth | 35/46 A |

Primary Examiner—William H. Grieb
Attorney, Agent, or Firm—Seed, Berry, Vernon & Baynham

[57] ABSTRACT

A world globe is described which allows repeated assembly and disassembly of the frame and surface segments of the globe. The globe includes a frame structure including a mounting base and mounting bow and a globe portion including opposed polar cap pieces mounted on the respective ends of an axis rod held between the terminating ends of the mounting bow. An equatorial ring is supported in place by bracing rods which extend between the respective polar cap members and the equatorial ring. Identical, transparent gore segments having opaque or translucent portions indicative of the land areas on the globe are snapped into place between the equatorial ring and the respective polar cap pieces. The globe is useful as a teaching aid, as an attractive design piece or for entertainment.

5 Claims, 6 Drawing Figures

WORLD GLOBE WHICH CAN BE ASSEMBLED OR DISASSEMBLED

BACKGROUND OF THE INVENTION

1. Field of the Invention

This invention relates to a world globe useful as a teaching and educational aid which can be repeatedly assembled and disassembled and to a method of assembling and disassembling such.

2. Prior Art Relating to the Disclosure

Conventional globes used in classrooms provide some aid to the teacher in teaching geographic and spatial relationships of land to land, land to water, etc.: however, learning such relationships is best accomplished by assembling sections of a globe, this process being dependent upon close observation of a conventional globe during assembly.

SUMMARY OF THE INVENTION

It is a primary object of this invention to provide a world globe which can be repeatedly assembled and disassembled.

It is a further object of this invention to provide a world globe which, as assembled, is transparent through water bodies, allowing comparison of the relative positions of land and water bodies.

It is a further object of this invention to provide a world globe which, because of its construction, can be marked to name oceans, seas, and continents, such markings being easily removable so that the globe can be reused.

It is a further object of this invention to provide a world globe of unique and attractive design.

It is a further object of this invention to provide a set of curved transparencies for purposes of enlarged projection on a flat surface, such transparencies being the outer surface segments of the globe.

DESCRIPTION OF THE PREFERRED EMBODIMENTS

Figure 1:
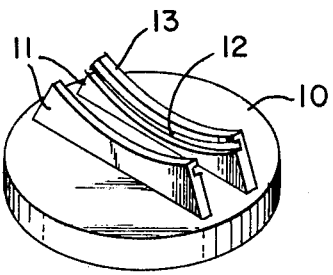
FIGS. 1 to 5 illustrate steps of assembling the globe of this invention.
Figure 2:
Figure 3:
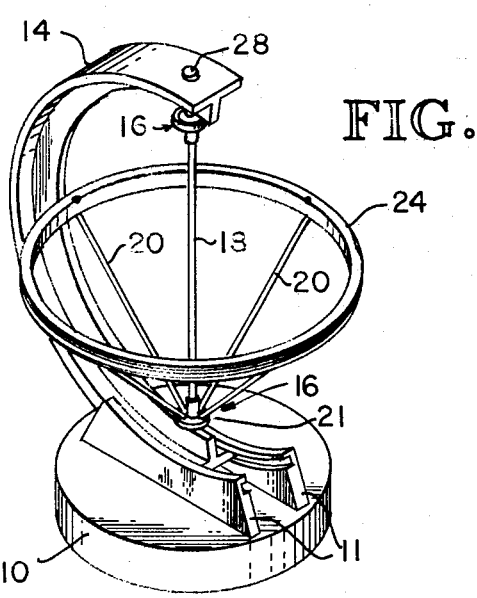

FIGS. 1 to 5 illustrate assembly of the world globe of this invention. A mounting base 10 of wood, plastic or other material includes spaced, parallel upstanding slide blocks, each having an inner slot 12 near the upper end thereof with each of the slots open at each end to receive the legs of a T-shaped mounting bow 14 whose legs 14a are adapted to slide in the slots 12 of the slide blocks 11. Each of the slide blocks has an arcuate upper surface 13, which arc is equal to the arc of the C-shaped mounting bow 14. The slots 12 also have an arc equal to the arc of the mounting bow 14.

The mounting bow includes openings 15 drilled therethrough at each of its terminating ends to receive the globe assembly to be described. The mounting bow is made of a suitable material such as plastic, wood or metal and should be sufficiently flexible to clamp the globe assembly in place between its terminating ends.

The globe assembly is assembled and inserted between the arms of the C-shaped mounting bow. A polar cap piece 16, best illustrated in cross section in FIG. 6, includes a lower base portion 16b and an upper portion 16a. A central bore 17 extends through the polar cap piece to receive one end of axis rod 18. Sockets 19 are provided at an angle to the axis of the polar cap piece 16 as illustrated to receive one end of a series of four bracing rods 20. The sockets may be formed by drilling openings in the lower portion 16b or by molding the cap piece 16 with spaced ribs which clamp the respective ends of each of the series of rods in place. A continuous ring slot 21 is provided on the top surface of the upper portion 16a to receive one end of the gore segments 23, as will be explained. An equatorial ring 24 having an outer groove 25 extending around its circumference also includes opposed sockets 26 at spaced intervals therearound on both the lower and upper surfaces thereof to receive the respective other ends of the bracing rods 20. The equatorial ring is of a diameter equaling the diameter of the gore segments 23 when assembled to form a sphere.

Figure 4:
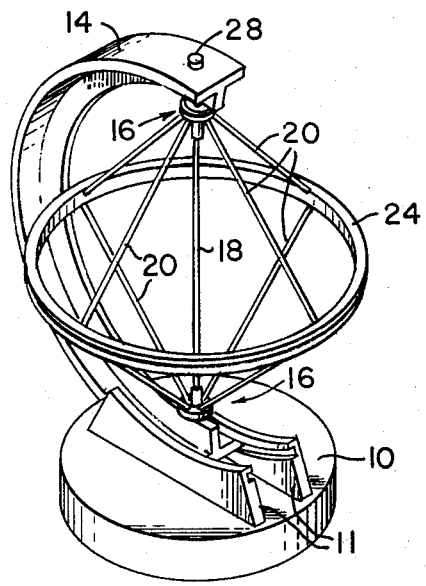
Figure 5:
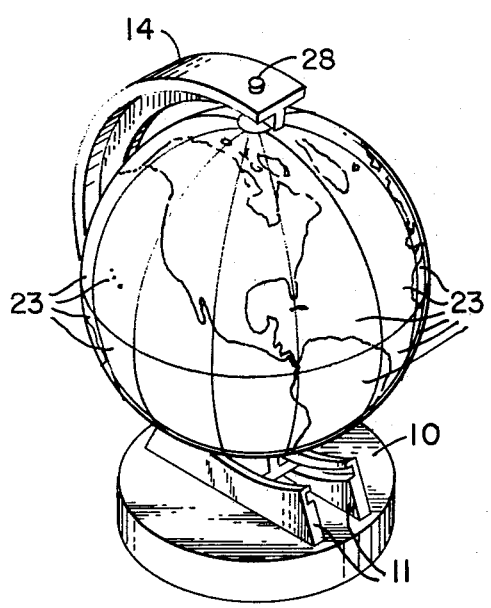
Figure 6:
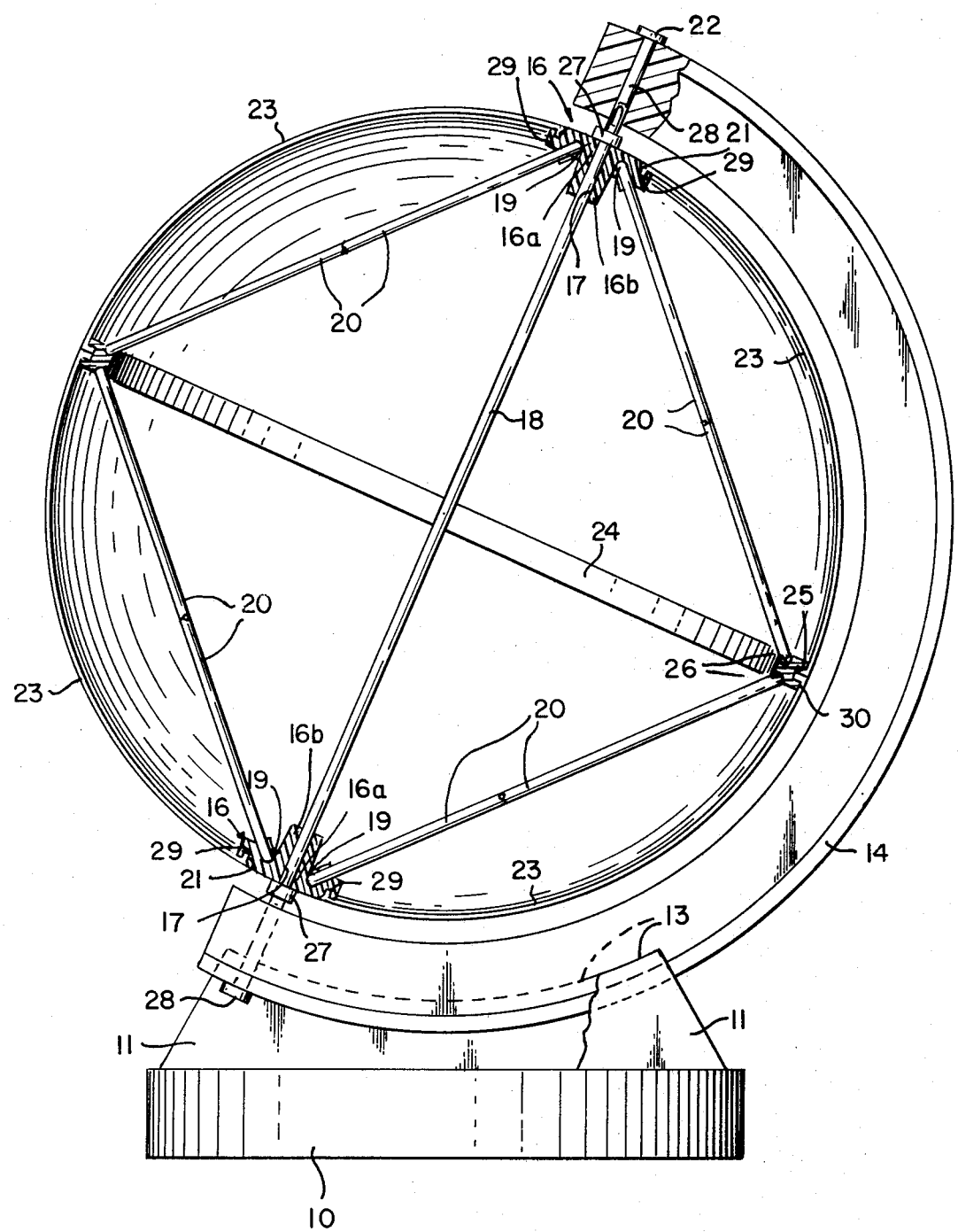
FIG. 6 illustrates a cross section of the assembled globe of FIG. 5.

To assemble the globe, bracing rods 20 are inserted in the respective sockets 19 of one of the polar pieces 16. The axis rod 18 which is threaded at each of its ends is then inserted through the bore in the polar cap and secured by a nut 27 as illustrated in FIG. 6. The opposite ends of the bracing rods 20 are then aligned in respective sockets 26 of the equatorial ring. Additional bracing rods are then secured in the opposed sockets of the equatorial ring at one end and in the sockets 19 of the opposed polar cap piece 16 as illustrated in FIG. 4. The other end of the axis rod extends through the bore of the opposed polar cap piece and is held in place by a nut 27 which is tightened sufficiently to place the entire assembly (polar cap pieces, brace rods and equatorial ring) under compression to retain the brace rods in the respective sockets of the equatorial ring and polar cap pieces. The respective protruding ends of the axis rod are then placed into the respective openings 15 of the mounting bow and secured with internally threaded bolts 28 which extend through the openings 15 of the mounting bow and into contact with the respective threaded ends of the axis rod 18. Each of the bolts 28 has internal threads thereon which threadedly secure the respective ends of the axis rod to the mounting bow.

Gore segments 23, each of identical, transparent, semi-flexible plastic material or other suitable material are then snapped into place between the polar cap and equatorial ring to complete assembly of the globe. Referring to FIG. 6, each gore segment is an arcuate, triangular section whose respective narrow ends include a projection 29 adapted to fit into the respective slots 21 of each of the polar cap pieces. At the opposite ends of each gore segment is an inwardly-directed flange 30 which fits into the groove 25 of the equatorial ring as illustrated in FIG. 6. Each of the gore segments are preferably of a transparent plastic material and may include an opaque or translucent outline of the land area which it represents. The gore segments may be cut from spheres into 24 segments i.e. 12°–30° segments for the Northern Hemisphere and 12°–30° segments for the Southern Hemisphere, or into 48 segments, or any other division that may be desired.

Parallels of latitude and longitude may be marked internally or externally on each of the segments with or without degree numbers. The material of which the segments are made allows marking on the segments to identify oceans, continents, seas or other land and water features with grease pencil, water soluble ink, etc. The markings are easily removed when desired. Removable overlays may also be used to overlay the segments if desired. Each of the gore segments is sufficiently flexible and is under a small amount of tension when snapped into place between the polar cap piece and equatorial ring so that it does not easily fall out when assembled.

Although the world globe is primarily designed as an educational aid in the school, home, or office, it is of unique design and is an attractive furnishing as well. The globe, as illustrated, is 16 inches diameter at its equator and has a base 12 inches in diameter. The gore segments are preferably made from a blue plastic material representing the oceans. Topographical overlays can be added to the internal surface of the gore segments or external surface of the gore segments as desired. The globe may also be tilted as desired by rotating the mounting bow in the sliding blocks to the desired degree of inclination.

The embodiments of the invention in which an exclusive property or privilege is claimed are defined as follows:

1. A globe which can be repeatedly assembled and disassembled comprising:
    a C-shaped arc,
    a base having a mounting portion thereon adapted to slidably receive and support the C-shaped arc,
    members representing the polar caps of the globe pivotally supported for rotation to the respective terminating ends of the C-shaped arc, each of the polar cap members having a central bore therein coaxial with the axis of the polar cap member and spaced sockets to receive one end of a series of bracing rods, the spaced sockets extending from the polar cap member at an angle with respect to the axis of the polar cap member,
    an axis rod extending between the opposed polar cap members and through the respective central bores thereof for securing the polar cap members to the C-shaped arc,
    a ring representing the equator of the globe having spaced sockets therein to receive the respective other ends of the series of spaced bracing rods,
    a series of bracing rods, each rod supported at one end in the socket of one of the polar cap members and at the other end in the opposed socket of the equatorial ring, and
    a series of semi-rigid, arcuate, triangular-shaped gore segments of a sphere, each segment adapted to be held under tension between one of the polar cap members and the equatorial ring, the tension holding the gore segment in place.

2. The globe of claim 1 wherein each of the gore segments is transparent and includes surface markings thereon representing land areas of the globe.

3. The globe of claim 1 wherein each of the polar cap members includes an opening therein to receive the narrow end of each of the gore segments for support thereof and wherein the equatorial ring includes a circumferential groove therearound to receive the wide end of each of the gore segments.

4. The globe of claim 3 wherein each of the gore segments includes an inwardly projecting member at the narrow end thereof adapted to be received in the opening of the polar cap members and an inwardly directed flange at the opposite end adapted to be received in the groove of the equatorial ring.

5. A method of assembling a globe comprising:
    providing two polar cap members having spaced sockets therearound, an opening therein adjacent the sockets and an annular bore extending therethrough coaxial with the axis thereof,
    inserting an elongated axis rod through the annular bore of one of the polar cap members, the axis rod threaded at each of its ends and securing the axis rod to the polar cap member,
    inserting one end of a series of elongated bracing rods in the spaced sockets of the first of the polar cap members, the bracing rods extending from the cap members at an acute angle with respect to the axis of the first polar cap member,
    inserting the other end of the bracing rods into spaced sockets of an equatorial ring, the equatorial ring having an outer circumferential groove therein,
    inserting bracing rods into opposed sockets of the equatorial ring to extend toward the second polar cap member,
    inserting the second polar cap member over the axis rod, the bracing rods in the spaced openings of the polar cap member and securing the second polar cap to the axis rod as to put the entire globe assembly under compression, and
    inserting gore segments between the respective polar cap members and the equatorial ring to form a sphere representing the globe.

* * * * *